May 22, 1956    E. R. FITCH ET AL    2,746,255
FLUID PRESSURE SYSTEM
Filed March 4, 1953
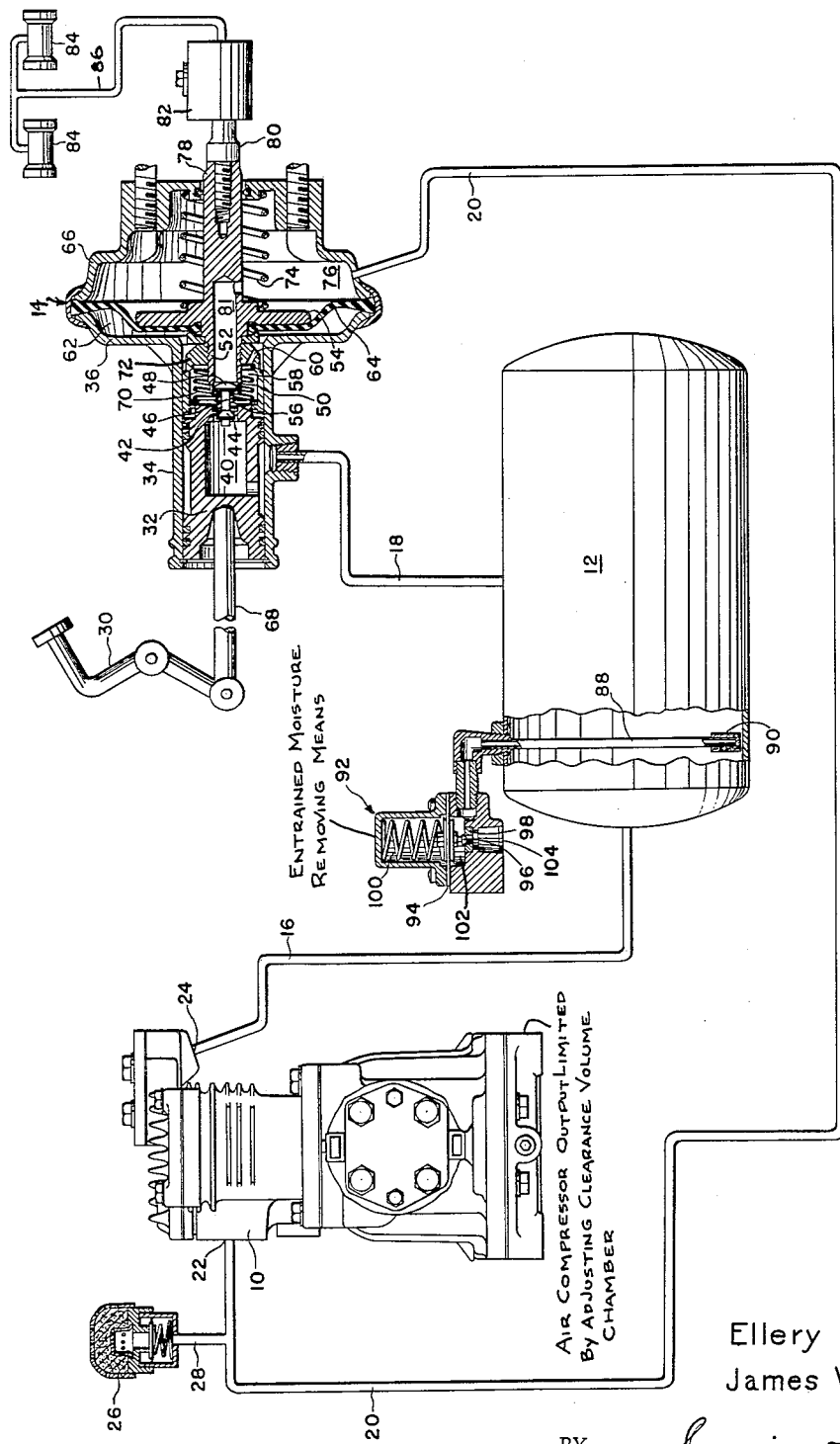
INVENTORS
Ellery R. Fitch,
James V. Ralston
BY
ATTORNEYS United States Patent Office 2,746,255
Patented May 22, 1956

2,746,255

FLUID PRESSURE SYSTEM

Ellery R. Fitch and James V. Ralston, Elyria, Ohio, assignors to Bendix-Westinghouse Automotive Air Brake Company, Elyria, Ohio, a corporation of Delaware Application March 4, 1953, Serial No. 340,342

8 Claims. (Cl. 60—57)

This invention relates to fluid pressure supply systems and more particularly to a closed system wherein the fluid is recirculated and is not exhausted to atmosphere after being utilized to perform work.

The principal object of the present invention is to provide a novel closed system for the supply of compressed air which is so constituted and arranged as to avoid the necessity of employing complicated and expensive control devices for the compressor and the reservoirs which have heretofore been utilized in prior systems of this type.

Another object of the invention is to provide a simplified arrangement of the foregoing character wherein the compressor is in continuous operation, when the system is in use, and wherein the compressor output is limited by the clearance volume thereof, so that costly unloading and governing mechanisms heretofore considered necessary, are dispensed with.

A further object comprehends a novel method and apparatus for exhausting to atmosphere, any moisture which may be entrained in the compressed air and which may accumulate in the system.

Still another object is to provide a system of the above type, wherein the compressed air utilized for energization of a suitable actuator may be exhausted therefrom and returned directly to the compressor without the necessity of employing a low pressure reservoir.

A still further object is to provide a relatively simple and low cost compressed air system which may be readily used on motor vehicles equipped with hydraulic brakes in order to efficiently operate and control such brakes through the application of compressed air.

Other objects and novel features of the invention will appear more fully hereinafter from a consideration of the following description when taken in connection with the accompanying drawing. It will be expressly understood, however, that the drawing is utilized for purposes of illustration only, and is not to be taken as a definition of the limits of the invention, reference being had for this purpose to the appended claims.

In the drawing, the invention is illustrated diagrammatically, certain parts thereof being shown in section.

Referring more particularly to the drawing, the closed system of the present invention is illustrated therein as including a compressor 10, a reservoir 12 and a valve controlled power actuator or motor 14, these elements being interconnected by conduits 16, 18 and 20 in order to provide a closed system wherein the fluid compressed by the compressor is recirculated and is available to perform work.

The compressor 10 is preferably of the type employing one or more reciprocating pistons and the clearance space or clearance volume chamber between the outlet valve in the head of the compressor and the top of the piston at its upper limit of its stroke is designed and adjusted so that the output of the compressor balances out at a predetermined value as, for example, 100 p. s. i. above atmospheric pressure. In other words, because of the enlarged clearance space, the compressor is incapable of delivering a greater output above atmospheric pressure, than a predetermined value, even though it is in continuous operation. As shown, the system is utilized for the compressing of air and the compressor 10 is provided with an inlet 22 and an outlet 24. Thus it will be readily understood that with the clearance volume chamber of the compressor adjusted as above indicated, the pressure delivered to the reservoir 12 will be maintained at 100 p. s. i. above atmospheric pressure with the compressor in continuous operation. A spring-closed atmospheric inlet check valve 26 is connected with the return conduit 20 to the inlet of the compressor through conduit 28 in order to provide atmospheric pressure for the compressor when the system is initially charged and in order also to provide make-up air for the system in the event of any leakage therefrom. With such an arrangement, it will be readily seen that when the system is originally placed in operation and assuming that there is no pressure therein, operation of the compressor 10 will draw in air from the atmosphere through the check valve 26 and will furnish compressed air to the reservoir 12 through the conduit 16. Assuming that the output of the compressor does not exceed 100 p. s. i., as above set forth, the pressure in the reservoir 12 will rise to this predetermined value and no further increase in such pressure will occur.

In order to utilize compressed air from the reservoir 12 for performing useful work, such as for example, the application of brakes upon a motor vehicle, the conduit 18 is connected with the valve controlled motor 14 and the application and exhaust of fluid pressure to and from the motor 14 is under the control of a manually-operable pedal or other operator controlled member 30. More particularly, the pedal 30 is associated with a valve mechanism which includes a plunger 32 slidably received within a casing 34 which is formed as an extension of a pressure plate 36 of motor 14. Plunger 32 is formed with an inlet chamber 40 which communicates at all times with the conduit 18, and is also provided with an inlet valve seat 42 with which an inlet valve 44 is adapted to engage when the parts occupy the position shown. Inlet valve 44 is carried by a stem 46 and the latter also carries an exhaust valve 48 which is normally spaced from an exhaust valve seat 50 formed at the left end of an extension part 52 of a motor pressure plate 54. The valves 44 and 48 are constantly urged toward the positions shown on the drawing by means of a spring 56 interposed between the plunger 32 and the exhaust valve 48. In this position, communication is interrupted between the inlet chamber 40 and an outlet chamber 58, this latter chamber being in constant communication through a passage 60 with a pressure space or chamber 62 defined by the pressure plate 36 and a diaphragm 64 which is confined between the pressure plate 36 and a non-pressure plate 66. However, upon actuation of the pedal 30 the plunger 32 will be moved to the right through a link 68 to compress a spring 70 which is interposed between a part 72 carried by the extension 52 and the right hand end of the plunger 32. With the parts occupying the position shown, and with a spring 74 maintaining the pressure plate 54 and parts connected thereto in the left hand position, as indicated in the drawing, continued movement of the plunger 32 will take place and seat the exhaust valve 48 upon the seat 50. As soon as this occurs, communication between the outlet chamber 58 and an exhaust chamber 76, by way of bore 81 in extension 52, will be interrupted. Thereafter, further movement of the plunger 32 to the right will serve to move the inlet valve seat 42 away from the inlet valve 44 and thus conduct compressed air from the inlet chamber 40 to the outlet chamber 58 whereupon such air will be effective in the space 62 and against the diaphragm 64 to move the pressure plate 54 to the right to perform work.

In the event that movement of the pedal 30 is then arrested, it will be readily understood that the pressure plate 54 will continue to move to the right until a position is reached where the inlet valve 44 is closed through the action of the spring 56. In this condition, the valve mechanism is balanced or lapped and further movement of the pressure plate 54 and the output rod 78 connected thereto is arrested. If it is desired to move the plate 54 and rod 78 further to the right, it is only necessary to repeat the foregoing operations and the inlet valve 44 will thereafter be closed after a predetermined amount of travel has been accomplished.

When it is desired to exhaust the motor 14, manually applied power to the pedal 30 is released. Thereupon, the spring 70 will move the plunger 32 and valves 44 and 48 to the left and the outlet chamber 58 and the chamber 62 will be connected with the exhaust chamber 76 by reason of the open valve 48 and bore 81. As the compressed air continues to flow from chambers 58 and 62 to chamber 76, the return spring 74 acting on the pressure plate 54 will return the latter to its retracted or inoperative position and the output rod 78 will be moved to the left as viewed in the drawing.

For purposes of illustration, the motor 14 has been associated with a hydraulic brake system of the general type now utilized on motor vehicles. The connection between the rod 78 and the brake system may be performed in any suitable manner such as, for example, connecting the rod 78 to a plunger 80 which in turn controls the movement of a conventional master cylinder and piston construction 82, the latter being associated with a plurality of wheel cylinders 84 as by means of a conduit system 86. In this manner, it will be readily appreciated that when the pedal 30 is operated to open the valve 44, the compressed air motor 14 is actuated to apply the vehicle brakes. On the other hand, when pressure is released from the pedal 30, the motor 14 is returned to its normal inoperative position and the hydraulic brake system of the vehicle is returned to release position in the conventional manner.

From the above, it will be readily seen that when the valve controlled motor is energized, the pressure plate 54 is moved to the right to apply the vehicle brakes. On the other hand, when the motor 14 is de-energized, the compressed air utilized for the energization of the said motor, is connected to the exhaust chamber 76 and is returned to the compressor inlet 22 by way of the conduit 20. Continuous operation of the compressor 10 serves to compress the air returned to the compressor and again charge the reservoir 12 in the manner heretofore described.

In the operation of a closed system of the above character, moisture entrained in the compressed air will be maintained at a minimum because of the fact that after initial charging of the system, the compressor is only connected with the atmosphere during such times as it is necessary to make up air lost by leakage. However, some moisture may accumulate in the reservoir 12 and the present invention provides a novel method and mechanism for exhausting this moisture to atmosphere. More particularly, and as shown in the drawing, the invention provides a conduit 88 which extends from the top of the reservoir 12 to a point adjacent to the bottom thereof and the lower end of such conduit is open and may be surrounded by a suitable filter 90. At its upper end, the conduit 88 communicates with a discharge valve 92 which may comprise a diaphragm 94 to which an exhaust valve 96 is secured. The exhaust valve 96 is normally maintained against a seat 98 by means of spring 100 and the tension of such spring is so chosen and adjusted that the pressure beneath the diaphragm 94 and existing in chamber 102 must rise to a value slightly in excess of the compressor output before the exhaust valve 96 opens. In the example heretofore described, the compressor output has been assumed to be 100 p. s. i. In this event, the spring 100 is so adjusted that the exhaust valve 96 will open when the pressure within the reservoir 12 reaches a value of 110 p. s. i., for example. When such a pressure is attained, the exhaust valve 96 will be opened and any moisture accumulating in the bottom of the reservoir 12 and in the lower end of the conduit 88 will be blown out to atmosphere by way of the open exhaust valve 96 and atmospheric connection 104.

The operation of the above system is believed to be clear from the foregoing description. On initial charging, the compressor draws air through the check valve 26 from the atmosphere and compresses such air and delivers it to the reservoir 12 and to the inlet chamber 40 of the motor 14. As soon as the output pressure of the compressor reaches a value of 100 p. s. i., for example, the compressor is balanced and no further increase in output pressure occurs even though the compressor is in continuous operation. This will be clear when it is recalled that the clearance volume chamber of the compressor is of such a volume that the output of the compressor is limited to a predetermined value such as that heretofore assumed. Under these conditions, air within the compressor will be repeatedly compressed and re-expanded in the cylinder and the clearance space but the terminal pressure, when the piston is at top dead center position, will not exceed the predetermined value. It will also be understood that when full pressure is attained in the reservoir 12 and the chamber 40, the check valve 26 will close under the influence of its spring, and the pressure in the return line 20 and the interconnected chambers 76 and 62 will be approximately atmospheric pressure.

Under the above conditions, the reservoir of compressed air 12 is available for the operation of the vehicle brakes. Such operation may be readily effected through manipulation of the pedal 30 in the manner heretofore set forth in detail. Upon return of the pedal 30 to its normal inoperative position, the compressed air utilized for energizing the motor 14 is connected to the exhaust chamber 76 of the motor and is returned to the compressor inlet 22 through the conduit 20.

It has been found in practice, and assuming the values heretofore set forth, that on a fast series of application and releases of the device 14, the pressure of the reservoir 12 balances at some value slightly below 100 p. s. i., as for example, 70 or 80 p. s. i. This lowering of the reservoir pressure, however, only occurs on a fast cycling of operation which would not be resorted to in the usual operation of the brakes of a vehicle. In the usual case, the brakes may be applied and released and the pressure is promptly restored in the reservoir 12 to the predetermined value assumed.

In the event, however, that the motor 14 is maintained in applied position for a few moments until operation of the compressor 10 restores the pressure in the reservoir 12 to 100 p. s. i., and the motor 14 is thereafter exhausted to connect chamber 62 with chamber 76 and the conduit 20, a novel operation occurs which is utilized by the present invention for the purpose of momentarily connecting the reservoir 12 to the atmosphere and for exhausting any entrained moisture in such reservoir. For example, upon exhausting of the chamber 62 under the above conditions, the air pressure conveyed to the inlet 22 of the compressor 10 momentarily supercharges the latter. Operation of the compressor then temporarily increases the output thereof to a value in excess of 100 p. s. i. and as soon as the pressure in the tank 12 rises to the value of the setting of the spring 100, which may be 110 p. s. i., the exhaust valve 96 opens and the reservoir 12 is connected to the atmosphere. Thus, the slight increase in pressure under these conditions is exhausted to atmosphere and any entrained moisture in the bottom of the reservoir 12 and in the conduit 88 is exhausted.

From the foregoing, it will be readily seen that the present invention provides a novel closed system for compressing fluid and is especially adaptable for the compressing of air. The arrangement is exceedingly simple and avoids the necessity of incorporating low pressure reservoirs and expensive and complicated governor and unloading devices. The compressor employed is of the reciprocating type and utilizes no automatic controls whatsoever, it only being necessary to arrange the clearance volume space or chamber of the compressor so that the volume thereof will be such that the output of the compressor will not exceed a predetermined value above atmospheric pressure, such as 100 p. s. i., for example. The arrangement and construction of the valve controlled power actuator 14 also contributes to the simplicity and efficiency of the system since it will be obvious that in the event of any failure of the supply of compressed air, the hydraulic brakes of the vehicle may be readily applied by manual movement of the pedal 30. In this instance, the plunger 32 when moved to the right will engage the left hand end of the member 72 and will transmit manually applied power directly to the master cylinder through the pressure plate 54 and the rod 78 secured thereto.

A further important feature of the invention resides in the novel arrangement and method whereby the accumulated moisture in the system is exhausted to atmosphere. For this purpose, the motor 14 is merely held in applied position until the pressure in the reservoir 12 has been restored to the predetermined value of 100 p. s. i. When this occurs, the motor 14 is exhausted and the supercharging of the compressor through the exhaust of compressed air from the motor causes the pressure to momentarily increase its output to the value determined by the setting of the spring 100 of the pressure responsive valve device 92.

While the system of the invention has been illustrated and described in connection with the application of motor vehicle brakes, it will be readily understood that the invention may be used for the operation of other types of devices. Modifications and changes may also be made in the system as described, as will be understood by those skilled in the art, without departing from the spirit of the invention. Reference will therefore be had to the appended claims for a definition of the limits of the invention.

What is claimed is:

1. A closed system for compressed air comprising a compressor having an inlet, an outlet and a clearance volume chamber to limit the pressure output of the compressor to a predetermined value above atmospheric pressure, a reservoir connected with said outlet for the storage of compressed air at said predetermined value, means in said reservoir for receiving moisture entrained in the compressed air, an actuator, means for conducting compressed air from the reservoir to the actuator to energize the latter, means to conduct compressed air from the actuator to the compressor inlet to temporarily supercharge the compressor and increase the pressure output thereof above said predetermined value, means responsive to a predetermined increase in pressure in said reservoir above said predetermined value to connect said moisture receiving means with the atmosphere to discharge entrained moisture, and means for supplying make-up air to the compressor inlet at atmospheric pressure.

2. A closed system for compressed air comprising a compressor having an inlet, an outlet and a clearance volume chamber to limit the pressure output of the compressor to a predetermined value above atmospheric pressure, a reservoir connected with said outlet for the storage of compressed air at said predetermined value, means in said reservoir for receiving moisture entrained in the compressed air, an actuator, means including a valve for conducting compressed air from the reservoir to the actuator to energize the latter, means including a second valve for conducting compressed air from the actuator to the compressor inlet to temporarily supercharge the compressor and increase the pressure output thereof above said predetermined value, a pressure responsive device connected with said reservoir and said moisture receiving means and responsive to a predetermined increase in pressure in said reservoir above said predetermined value to discharge entrained moisture to atmosphere, and means for supplying make-up air to the compressor inlet at atmospheric pressure.

3. A closed system for compressed air consisting of a compressor having an inlet, an outlet and a clearance volume chamber to limit the pressure output of the compressor to a predetermined value above atmospheric pressure, a reservoir connected with said outlet for the storage of compressed air at said predetermined value, a compressed air operated motor having a pressure chamber and an exhaust chamber, a connection between said chambers, means including a valve device movable in one direction to close said connection and connect the reservoir with the pressure chamber to energize the motor, and movable in the opposite direction to disconnect the reservoir from the pressure chamber and open said connection to allow compressed air in the pressure chamber to flow into said exhaust chamber, means connecting the exhaust chamber at all times with the compressor inlet, and an atmospheric check valve connected with the last-named means.

4. In a closed system for compressed air comprising a compressor having an inlet, an outlet and a clearance volume chamber for limiting the pressure output of air compressed by the compressor to a predetermined value above atmospheric pressure, a reservoir for air compressed by the compressor, and a motor, the method of removing accumulated moisture from the reservoir which comprises applying compressed air from the reservoir to the motor to operate the latter and to reduce the pressure in the reservoir to a value less than said predetermined value, maintaining the application of compressed air to the motor for a time sufficient to allow the compressor to restore the pressure of the air in the reservoir at said predetermined value, releasing the compressed air from the motor to the compressor inlet to supercharge the compressor and temporarily increase the pressure output thereof above said predetermined value, exhausting compressed air and accumulated moisture from the reservoir to atmosphere when the pressure in the reservoir reaches a value slightly higher than said predetermined value, and supplying make-up air to the compressor inlet at atmospheric pressure.

5. A closed system for compressed air comprising a compressor having an inlet, an outlet and a clearance volume chamber to limit the pressure output of the compressor to a predetermined value above atmospheric pressure, a reservoir connected with said outlet for the storage of compressed air delivered by said compressor, a compressed air operated motor comprising a housing having a pressure responsive member movable therein and dividing the housing into a pressure chamber and an exhaust chamber, means normally connecting said chambers, an inlet chamber connected at all times with said reservoir, valve means movable in one direction to close said connecting means and to connect the inlet chamber with the pressure chamber to energize the motor with compressed air from said reservoir, and movable in the opposite direction to disconnect the inlet chamber from the pressure chamber and to reopen said connecting means to allow compressed air from said pressure chamber to flow into said exhaust chamber, means constantly connecting the exhaust chamber with the inlet of the compressor, and means for supplying make-up air to the compressor inlet at atmospheric pressure.

6. A closed system for compressed air comprising, a compressor having an inlet, an outlet and a clearance volume chamber to limit the pressure output of the compressor to a predetermined value above atmospheric pressure, a reservoir connected with said outlet for the storage of compressed air at said predetermined value, means in said reservoir for receiving moisture entrained in the compressed air, a compressed air operated motor comprising a housing having a pressure responsive member movable therein and dividing the housing into a pressure chamber and an exhaust chamber, means normally connecting said chambers, an inlet chamber connected at all times with said reservoir, valve means movable in one direction to close said connecting means and to connect the inlet chamber with the pressure chamber to energize the motor with compressed air from said reservoir, and movable in the opposite direction to disconnect the inlet chamber from the pressure chamber and to reopen said connecting means to allow compressed air from said pressure chamber to flow into said exhaust chamber, means constantly connecting the exhaust chamber with the inlet of the compressor, means for operating said valve means in said one direction to energize the motor and for operating said valve means in the opposite direction to allow compressed air to flow from said pressure chamber to the compressor inlet by way of said exhaust chamber and said connecting means to temporarily supercharge the compressor and increase the pressure output thereof above said predetermined value, a pressure responsive device connected with said reservoir and said moisture receiving means and responsive to a predetermined increase in pressure in said reservoir above said predetermined value to discharge entrained moisture to atmosphere, and means for supplying make-up air to the compressor inlet at atmospheric pressure.

7. A closed system for compressed air comprising, a compressor having an inlet, an outlet and a clearance volume chamber to limit the pressure output of the compressor to a predetermined value above atmospheric pressure, a reservoir connected with said outlet for the storage of compressed air delivered by said compressor, a compressed air operated motor comprising a housing having a pressure responsive member movable therein and dividing the housing into a pressure chamber and an exhaust chamber, means normally connecting said chambers, an inlet chamber connected at all times with said reservoir, means including a valve for closing said connecting means, means including a second valve for establishing communication between said inlet chamber and said pressure chamber for conducting compressed air to the latter to energize the motor, means for sequentially operating said valves so that movement of the last named means in one direction first closes the connecting means and then establishes communication between the inlet chamber and the pressure chamber to conduct compressed air to the latter, while movement in the opposite direction first interrupts communication between the pressure chamber and the inlet chamber and then reopens said connecting means, means including a conduit connecting the exhaust chamber at all times with the compressor inlet, and an atmospheric check valve connected with said compressor inlet.

8. A closed system for compressed air comprising, a compressor having an inlet, an outlet and a clearance volume chamber to limit the pressure output of the compressor to a predetermined value above atmospheric pressure, a reservoir connected with said outlet for the storage of compressed air at said predetermined value, means in said reservoir for receiving moisture entrained in the compressed air, a compressed air operated motor comprising a housing having a pressure responsive member movable therein and dividing the housing into a pressure chamber and an exhaust chamber, a conduit connecting the exhaust chamber at all times with the compressor inlet, means normally connecting said chambers, an inlet chamber connected at all times with said reservoir, means including a valve for closing said connecting means, means including a second valve for establishing communication between said inlet chamber and said pressure chamber for conducting compressed air to the latter to energize the motor, means for sequentially operating said valves so that movement of the last named means in one direction first closes the connecting means and then establishes communication between the inlet chamber and the pressure chamber to conduct compressed air to the latter, while movement in the opposite direction first interrupts communication between the pressure chamber and the inlet chamber, and then reopens said connecting means to allow compressed air to flow from the pressure chamber to the compressor inlet by way of the exhaust chamber and said conduit to temporarily supercharge the compressor and increase the pressure output thereof above said predetermined value, means responsive to a predetermined increase in pressure in said reservoir above said predetermined value to connect said moisture receiving means with the atmosphere to discharge entrained moisture, and an atmospheric check valve connected with the compressor inlet.

No references cited.